US009483307B2

(12) United States Patent
Turner

(10) Patent No.: US 9,483,307 B2
(45) Date of Patent: Nov. 1, 2016

(54) ASYNCHRONOUS, INTERACTIVE TASK WORKFLOWS

(71) Applicant: Swiftpage Act! LLC, Denver, CO (US)

(72) Inventor: George Murray Turner, Phoenix, AZ (US)

(73) Assignee: Swiftpage Act! LLC, Denver, CO (US)

( * ) Notice: Subject to any disclaimer, the term of this patent is extended or adjusted under 35 U.S.C. 154(b) by 0 days.

(21) Appl. No.: 14/450,079

(22) Filed: Aug. 1, 2014

(65) Prior Publication Data
US 2015/0067687 A1 Mar. 5, 2015

Related U.S. Application Data

(60) Provisional application No. 61/873,451, filed on Sep. 4, 2013.

(51) Int. Cl.
*G06F 9/46* (2006.01)
*G06F 9/48* (2006.01)
*G06F 3/0484* (2013.01)
*G06Q 10/06* (2012.01)

(52) U.S. Cl.
CPC ........... *G06F 9/4881* (2013.01); *G06F 3/0484* (2013.01); *G06Q 10/06316* (2013.01)

(58) Field of Classification Search
CPC .......... G06F 9/4881; G06Q 10/06316; G06Q 10/0633
USPC ....................................................... 718/102
See application file for complete search history.

(56) References Cited

U.S. PATENT DOCUMENTS

| 6,895,573 | B2 * | 5/2005 | Nørgaard et al. | 718/106 |
| 7,184,967 | B1 * | 2/2007 | Mital | G06Q 10/10 705/7.26 |
| 7,464,366 | B2 * | 12/2008 | Shukla | G06Q 10/06 705/7.27 |
| 7,653,562 | B2 * | 1/2010 | Schulz | G06Q 10/06 705/301 |
| 2005/0028158 | A1 * | 2/2005 | Ferguson et al. | 718/100 |
| 2005/0071187 | A1 * | 3/2005 | Zubizarreta | G06Q 10/10 715/704 |
| 2007/0156485 | A1 * | 7/2007 | Sanabria | G06Q 10/06 705/7.26 |

(Continued)

FOREIGN PATENT DOCUMENTS

EP 1686523 A1 8/2006

OTHER PUBLICATIONS

Jorgensen, "Interaction as a Framework for Flexible Workflow Modelling", 2001, ACM.*

(Continued)

*Primary Examiner* — Anna Deng
*Assistant Examiner* — Junchun Wu
(74) *Attorney, Agent, or Firm* — Swanson & Bratschun, L.L.C.

(57) ABSTRACT

A method of performing an asynchronous, interactive workflow is provided. The method includes generating a workflow comprising one or more tasks and executing at least a portion of the one or more tasks of the workflow automatically, without user interaction, and in response to a trigger. The method further includes detecting that a current task of the one or more tasks of the workflow requires user interaction, adding the current task to a to-do list of tasks requiring user interaction, and determining that one of an at least one user associated with the workflow has logged on, presenting at least one task from the to-do list to the user, receiving the required user interaction, and executing the at least one task from the to-do list based on the received user interaction.

20 Claims, 5 Drawing Sheets

(56) References Cited

U.S. PATENT DOCUMENTS

| | | | | |
|---|---|---|---|---|
| 2007/0240046 | A1* | 10/2007 | Yan | G06Q 10/06 715/700 |
| 2008/0065455 | A1* | 3/2008 | Sun | G06Q 10/06316 705/7.26 |
| 2008/0229305 | A1* | 9/2008 | Maeda | G06Q 10/10 718/100 |
| 2009/0125360 | A1* | 5/2009 | Ito | 705/8 |
| 2009/0150900 | A1 | 6/2009 | Kowalkiewicz | |
| 2009/0222817 | A1* | 9/2009 | Faatz | G06Q 10/06 718/100 |
| 2009/0307189 | A1* | 12/2009 | Bobbitt | G06F 17/30 |
| 2010/0305997 | A1* | 12/2010 | Ananian | G06F 9/5038 705/7.27 |
| 2011/0161284 | A1* | 6/2011 | Tewari | G06F 17/30371 707/609 |
| 2013/0311927 | A1* | 11/2013 | Grossman | G06F 3/048 715/771 |
| 2014/0019986 | A1* | 1/2014 | Reis et al. | 718/102 |

OTHER PUBLICATIONS

Karastoyanova et al., "Service-based Integration of Human Users in Workflow-driven Scientific Experiments", 2012, IEEE.*
Hollingsworth, "Workflow Management Coalition The Workflow Reference Model", Nov. 29, 1994, The Workflow Management Coalition.*
Search Report from EP 14183618-9 dated Oct. 22, 2014.

* cited by examiner

ASYNCHRONOUS, INTERACTIVE TASK WORKFLOWS

CROSS-REFERENCES TO RELATED APPLICATIONS

This application claims priority to U.S. patent application Ser. No. 61/873,451 (the "'451 Application"), filed Sep. 4, 2013 by George M. Turner, entitled, "Asynchronous, Interactive Task Workflows," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to workflow tools, and more particularly, to tools that allow asynchronous, yet interactive, workflow tasks.

BACKGROUND

In the field of computing, automated workflow tools serve an important role. Such tools can automate processes that normally would have to be performed by humans, rendering many tasks significantly less labor-intensive, and by extension, less expensive to perform. Traditionally, workflow tools have been divided into two types.

One type of tool, such as the well-known "chron" tool that is common to UNIX and UNIX-like environments, allows for unattended automation of tasks, which can include logging operations, maintenance tasks, batch jobs, any other kind of task that can be run without user interaction. But such tools, by their nature, are designed not to allow user interaction, and they are typically scheduled to run during off-hours when interactive system load is low. As such, these types of workflow tools (which more properly can be considered unattended automation tools) are designed to operate asynchronously—that is, without user presence or interaction.

The other type of workflow tool, which is common in many user applications, is designed to allow interaction with the user to customize, on a per iteration basis, the behavior of the workflow. For instance, a workflow might allow a user to choose one of several options for the next step, might allow the user to input text to be limited by the workflow, and/or the like. Simple examples of such workflows include application macros, user interface scripts, trouble ticket tracking applications, and the like. Typically, in such interactive tools, user presence is required, and the workflow cannot be performed asynchronously, because the tool must wait for user interaction before proceeding to the next step in the workflow.

Hence, there is a need for workflow tools that can both operate asynchronously and allow for user interaction to customize the workflow behavior on a per iteration basis.

BRIEF SUMMARY

Some embodiments provide enhanced workflow tools and techniques. In some cases, these tools and techniques can be implemented in a contact management application, such as ACT! 2013™, commercially available from Swiftpage™, although embodiments are not so limited. In a novel aspect, certain embodiments allow workflows to be executed unattended (e.g., on a server) without requiring user presence, yet still allowing for user interactivity where necessary. In particular embodiments, the workflow application might implement a locking technique to enable different workflow services (which can include services operating on multiple servers and/or client computers) access to a common pool of workflow instances. In such embodiments, each service can execute workflow tasks when appropriate, and in some cases, the executing service can lock the workflow instance to prevent conflicts while executing the tasks and then persist a state of the workflow instance when finished, allowing another workflow service to begin execution of the workflow from that state. Hence, for example, a workflow service on a server could begin execution of a workflow instance (e.g., based on the occurrence of a triggering condition, which might be a particular day/time, an update to a record, etc.) and then, when reaching a state at which user interaction is required, might persist that state and unlock the workflow instance. When the user logs in to the client application on a user computer, a workflow service at the user computer could detect the state of the workflow instance and begin execution of the workflow instance from the persisted state, e.g., to present the workflow instance to the user and receive the required user interaction. From that point, the system could continue execution of the workflow, using either the workflow service on the user computer or the workflow service on the server, or some combination of both.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

For example, one set of embodiments might provide methods. An exemplary method might comprise generating, with a computer, a workflow comprising one or more tasks, and executing, with the computer, at least a portion of the one or more tasks of the workflow automatically, without user interaction, in response to a trigger. The method might further comprise detecting, with the computer, that a current task of the one or more tasks of the workflow requires user interaction, adding, with the computer, the current task to a to-do list of tasks requiring user interaction in response to determining that the current task requires user interaction, and determining, with the computer, that one of an at least one user associated with the workflow has logged on. Upon making such determination, the method might further include presenting, with the computer, at least one task from the to-do list to the one of an at least one user responsive to determining that one of the at least one user has logged on, receiving, with the computer, the required user interaction, and executing, with the computer, the at least one task from the to-do list based on the received user interaction.

A program product in accordance with another set of embodiments comprises a non-transitory computer readable medium having encoded thereon a set of instructions, executable by one or more microprocessors to perform one or more operations. The set of instructions might comprise instructions for generating a workflow comprising one or more tasks, and instructions for executing at least a portion of the one or more tasks of the workflow automatically, without user interaction, in response to a trigger. The set of instructions might further comprise instructions for detecting that a current task of the one or more tasks of the workflow requires user interaction, instructions for adding the current task to a to-do list of tasks requiring user interaction in response to determining that the current task requires user interaction, and instructions for determining that one of an at least one user associated with the workflow has logged on. The set of instructions might further include instructions for once the user logs on, including instructions for presenting at least one task from the to-do list to the one of an at least one user responsive to determining that one of the at least one user has logged on, instructions for receiving the required user interaction, and instructions for executing the at least one task from the to-do list based on the received user interaction.

Similarly, a system in accordance with yet another set of embodiments might comprise a client computer and a server. At least one of the client computer or the server is configured to generate a workflow comprising one or more tasks, to receive the required user interaction, and to execute the at least one task from the to-do list based on the received user interaction. The client computer might be in communication with a server via a network connection, and might be further configured to indicate to the server that one of an at least one user associated with the workflow has logged on, to present at least one task from a to-do list to the one of an at least one user responsive to determining that one of the at least one user has logged on. The to-do list might comprise a list of tasks requiring user interaction. The server might be in communication via the network with the client computer and might be further configured to execute at least a portion of the one or more tasks of the workflow automatically, without user interaction, in response to a trigger, to detect that a current task of the one or more tasks of the workflow requires user interaction, and to add the current task to the to-do list of tasks requiring user interaction in response to determining that the current task requires user interaction. The server might be further configured to determine that the one of an at least one user associated with the workflow has logged on, based on an indication sent by the client computer, and to cause at least one task from the to-do list to be presented to the one of an at least one user responsive to determining that one of the at least one user has logged on.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
FIG. 1 illustrates an exemplary screen display presenting a user interface to receive user input to generate a workflow.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide the ability to have a workflow run unattended, in an automated fashion, and build a "to-do" list of tasks requiring user interaction or input, making implementation reflect real world process flow. Other workflow tools, such as chron jobs and Windows™ scheduler can only automatically execute those steps which do not require user input. The workflow service provided by various embodiments enables a series of steps that accurately represent business practices with optional user interaction at any point. This allows users to model their particular business practices and process flow.

In this document, the term, "workflow" is used as a general term for the sequence of activities that takes place in response to some trigger. Programmatically, a workflow is just the root node in a tree of activities. An "activity," then, can be considered an individual component in a workflow, for example send an email, schedule a call, update a record. Such an activity can also be called a "step" in the workflow. A "trigger" refers to some external event that causes a workflow to start running; examples include the following: a user clicks and manually runs a workflow; a database ("DB") record is updated; a scheduled event is raised, or the like. A "workflow definition" is a template that defines the sequence of steps and parameters that comprise a specific workflow type, and a "workflow instance" is a running instance of a workflow definition which has state, runs on its own thread, and is managed by a workflow engine. A "workflow engine" is a class that runs in a host application's process that manages running workflow instances (e.g., starting, stopping, exception handling, and communicating with, etc.); the workflow engine can be implemented as a "workflow service" on a computer capable of running services (such as a server computer and some user computers).

In one embodiment, a workflow (also referred to as "smart tasks") can allow users to automatically execute customized sequences of steps in response to some event. The feature encompasses an engine that executes these steps, DB schemas to support persisting and tracking of workflows, and a designer that allows users to create and edit custom workflows. For example, a workflow can describe a sequence of tasks that a user may repeatedly perform manually but could be automated. A workflow may consist of one task or many tasks, possibly taking place over some extended period of time. For example, in the ACT! Application, after creating a new opportunity whose value is greater than $10,000, an ACT! user may follow a sequence, including, without limitation, notifying his or her sales manager via email, scheduling a follow-up meeting with the lead, sending a "thank you" email to the lead after the meeting occurs, notifying his or her sales manager via email of the meeting results, and/or the like.

Many workflows can exist, and it is assumed that each user will want to be able to customize the settings and steps in a workflow for his or her specific business needs.

In an aspect, a workflow might be hosted within the application framework of the implementing application (such as a contact management application like ACT!). This can provide user-context for any running workflow such that workflows/activities can impersonate the logged in user. Thus, existing application access control and security models can be enforced on the workflows. Workflows/Activities can access application data through the standard application framework.

In some cases, the Windows Workflow Foundation Runtime ("WF") is hosted in the application framework. The host is created after a user logs on to a database. Once hosted, several services, including one called IFrameworkService, are made available to the WF engine. Since workflows run in the context of the currently logged on user, implementation and the consumption of IFrameworkService are made in this context. The lifecycle of the implementation of IFrameworkService matches that of the lifecycle of corresponding workflows.

Some embodiments feature a flexible, extensible workflow framework that allows any application to host user-customizable workflows, allows users to design those customizable workflows, and allows developers to provide custom activities and services that leverage application-specific functionality.

Using this framework, software applications in accordance with certain embodiments increase the usefulness of workflows by implementing a significant new capability "set it and forget it!"—i.e., the ability to run a smart task offline. With a client/server implementation, this feature allows users to configure any workflow to run from the server without the need for a client application to be running on the user's machine. A user can now run his or her existing or new workflows while the client runs on the user's computer, as well as running fully unattended workflows that execute on the server. Steps that require user feedback are allowed to partially execute on the server. Once such a step is reached within a workflow, the workflow is pending until the user logs on to the database and takes further action where, upon execution, the workflow will resume. For that user, these steps will show up in the "Show Pending User Workflow Steps" dialog creating a "to do" list. Using the unattended server workflow, a user can turn off his or her user computer at night or while traveling and still rest assured that tasks will run as time or events transpire.

The server functionality provided by some embodiments can include, without limitation, hosting the workflow engine in a service ("offline") for continuous execution, making use of database triggers for kicking off data-based steps, kicking off time-based steps by the service using the server clock; and impersonating a specific logged-in user within the application framework for proper context.

To facilitate unattended workflow, another significant advancement of some embodiments is the addition of data/field triggers. This feature allows workflow to include steps that automatically update database records once certain conditions are met, for example, changing the status to "Closed-Won" once the opportunity has reached the sales fulfillment stage. Simply put, this feature allows a user to configure workflows to proceed with the flow of the workflow once the specific user-defined database field conditions are met.

We now turn to the embodiments as illustrated by the drawings. FIGS. 1-5 illustrate some of the features of the method, system, and apparatus for implementing asynchronous, interactive workflow, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 illustrates an example user interface 100 for defining a field trigger that waits until the specified conditions defined by the logic are met, in accordance with various embodiments. Smart Task Name dialog box 101 allows the user to name the smart task. In the embodiment depicted, the input field shows that the smart task is given the name "Territory." A Description dialog box 103 allows the user to provide a description of the smart task. The Record Type dialog box 105 indicates the type of records used in evaluating the trigger. The Trigger dialog box 107 indicates a trigger condition to be detected. The Trigger dialog box 107 states "Run when conditions are met." The Conditions dialog box 111 is provided to allow the user to define the conditions used to trigger the smart task. Conditions dialog box indicates that the condition is met when a change occurs on a contact record and the State field being saved therein contains any of the state abbreviations for Arizona, New Mexico, or California. An Access dialog box 109 allows a user to select between "Public" and "Private" options to restrict access to the specific smart task. Although specific examples of field types, field names, configurations or arrangements of the fields are shown in the embodiment of FIG. 1, the embodiments are merely illustrative and not so limited, and various embodiments may include any number of varying field types, field names, and configurations/arrangements of the fields without deviating from the scope of the invention.

The sheer numbers of combinations of conditions and fields that can be configured provide a nearly limitless ability to automate tasks—without having to wait for any specific time of day or periodic manual checking being necessary. The tasks are fully customizable using the ability to extend service capabilities via plugins for step execution. Some embodiments further enable or configure an application programming interface ("API") to allow a developer or user to customize any workflow/steps. For example, a web service call may be launched or additional records/entities may be created upon receiving, identifying, or determining some data trigger action like an opportunity state changing from open to close, or to maintain a legacy or financial system.

Figure 2:
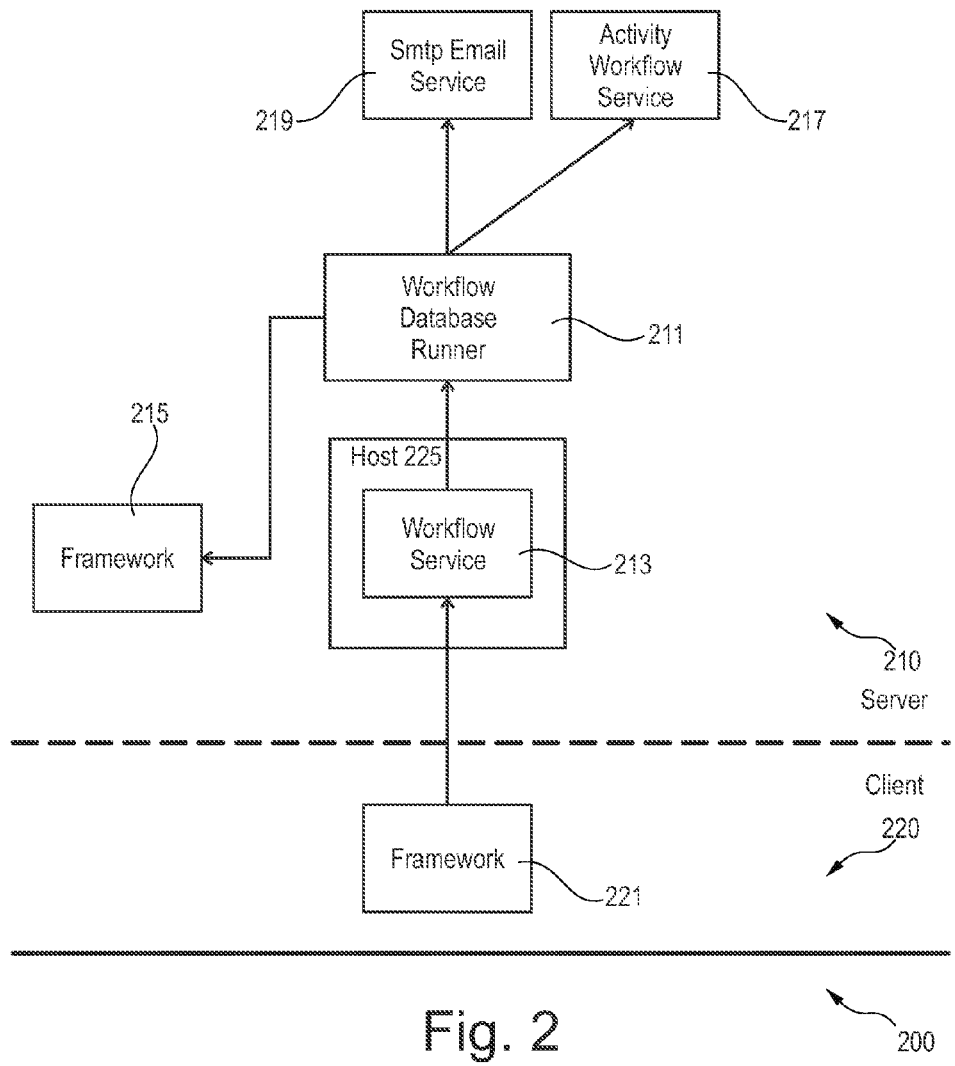
FIG. 2 is a functional block diagram illustrating an asynchronous, interactive workflow system, in accordance with various embodiments.

In some embodiments, a workflow service can be exposed as a Windows Communication Foundation ("WCF") service and can be hosted in the application's Server Host NT service. FIG. 2 is a system flowchart 200 of the components involved with running workflows unattended in accordance with some embodiments. The system 200 includes server side components 210 and client side components 220. The client framework 221 contains a code-generated proxy class that wraps calls to the workflow service 213. Host 225 hosts workflow service 213. The host 225 activates and routes incoming requests to instances of workflow service 213. In one embodiment, the host 225 is an ACT! Server Host NT service. The workflow service 213 interfaces with the client side framework 221 to allow the client to access and interface with Workflow Database Runner 211. For example, in one embodiment utilizing the ACT! Server Host NT Service, the workflow service 213 exposes client facing search methods, internally consuming IWorkflowRunner. This uses IUnityContainer to resolve the Act.Framework. ComponentModel.Workflow.WorkflowDatabaseRunner type for each workflow database user registered with the service. Workflow Database Runner 211 implements the logic to log the user onto the framework 215 and registers the workflow service 213 with the runtime and starts the runtime. Thus, the Framework 215 also provides the Workflow Database Runner with the proper data context for the workflow. Activity workflow service 217 creates an activity associated with a workflow step. SMTP email service 219 generates and sends e-mails for steps involving the generation and sending of e-mails, as defined in the configuration file for the service.

As illustrated by FIG. 2, in embodiments for a particular server 210 a single Workflow Service 213 can handle Workflows for all of the databases on that server. When a user runs a Workflow manually, or sets "AutoRun" (unattended) to "true," an instance of the Workflow is created in the database. This instance is created by a call to register the user in the client's Workflow Service 213 proxy. With this call, user context is set by the call source (client) and is specific to the binding and security configuration of the communication endpoint that is being consumed. A database monitoring system, such as Workflow Database Runner 211 is used by the Workflow Service 213 to scan the "pool" of workflow instances to determine the existence of a Workflow in any database on the server that the workflow service 213 can execute. As a Workflow is moved through its steps, the current state of the Workflow is persisted in the database. It is from this persisted state that the client knows the status of a workflow including workflows with a current step waiting for user interaction or workflows which have not completed in a timely fashion and may need user intervention.

In various embodiments, the workflow service 213 can run independently on the database server and/or on the same machine as windows ACT! client if its operating system supports services. Both workflow servers look at the list of pending tasks and process them if they are able to handle the task/step. When a task is picked up, it is locked out from any other smart task server and continues until completion of that task/step. At that point it will update that smart tasks instance's status information and effectively put it "Back in the pool" for any other server—including itself—to take the next step/tasks (and so on). There is no "Sync" process run separately, but rather this serialized execution of steps from the common "pool," with a lock on executing steps, allows any available processor to take the next smart task in a workflow.

Put simply a workflow is a series of tasks executed due to a trigger event and run until a step does not complete or the last step completes. These tasks are described and implemented as autonomous classes called Activities. Each Activity is designed to perform a specific task within the user's environment including the ACT! product code, add-on code, or even internet accessed resources. For example, the ScheduleACTActivity class implements the code to handle the generation of an ACT! activity. This may involve call outs to external service providers to complete the ACT! activity creation.

Figure 3:
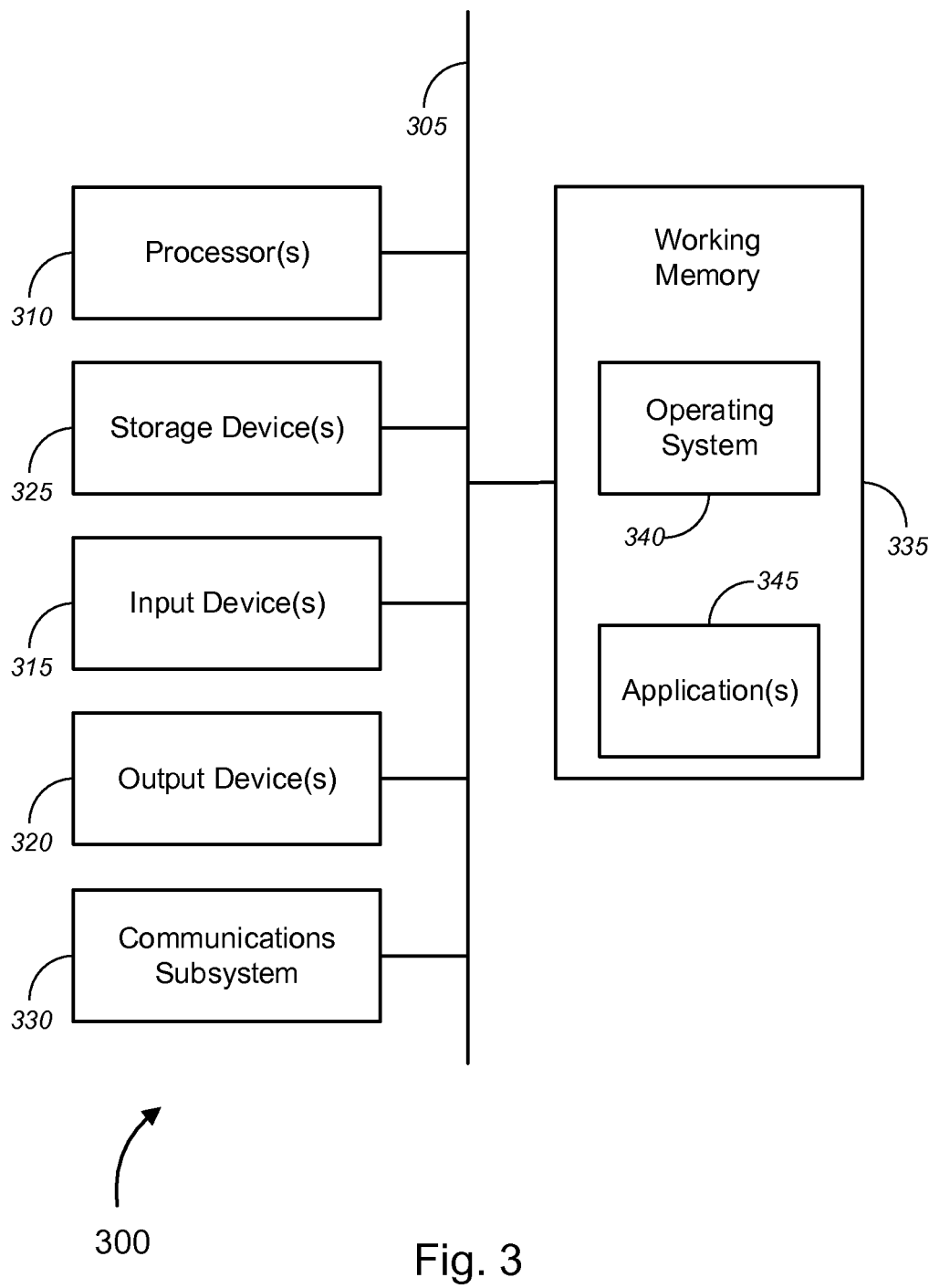
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as a server computer, a user computer, or the like. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include, without limitation, a display device, a printer, and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 300 might also include a communications subsystem 330, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals, and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
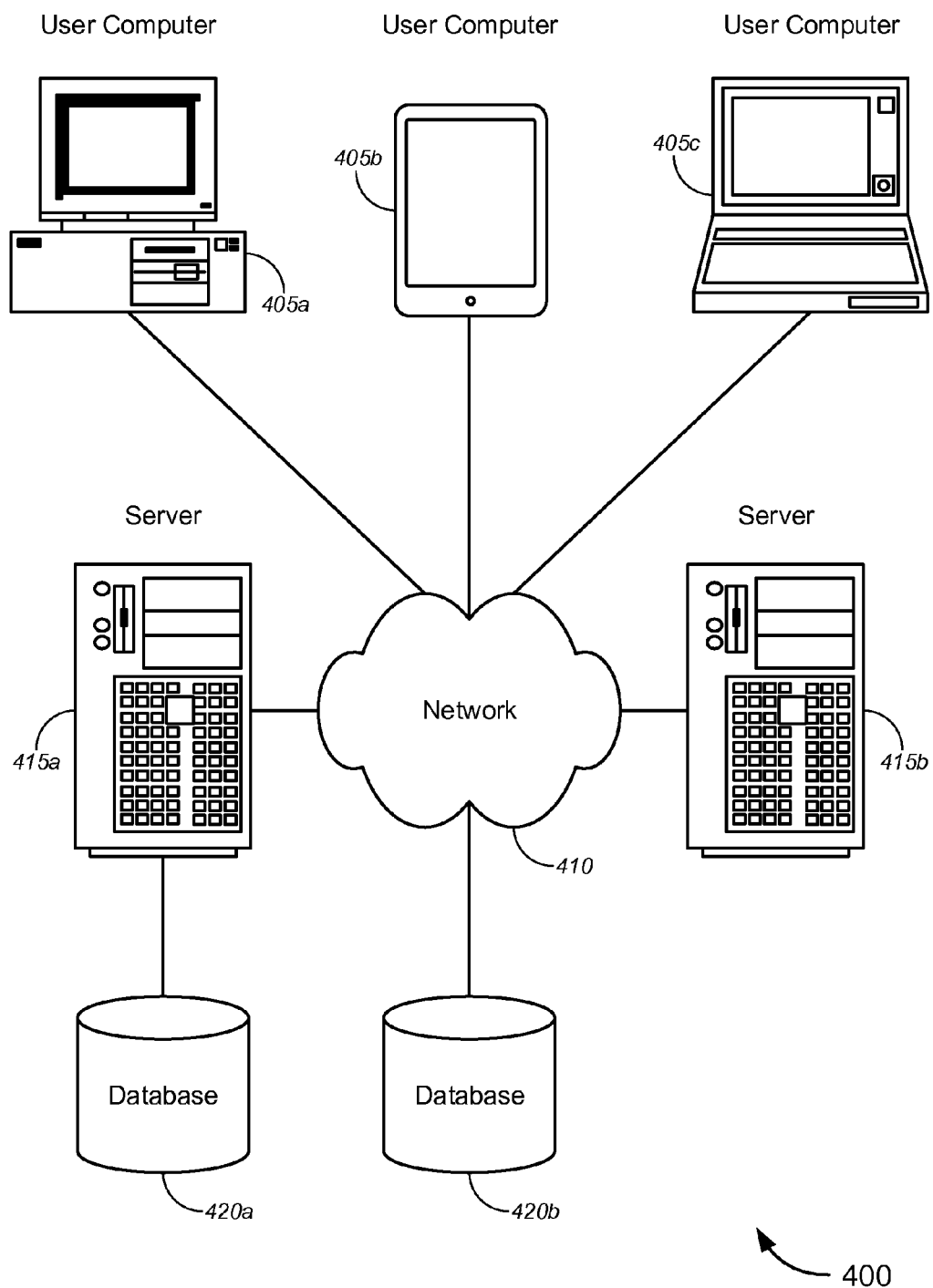
FIG. 4 is a block diagram illustrating a networked system of computers, which can be used in accordance with various embodiments.

As noted above, a set of embodiments comprises systems for executing workflow tasks. FIG. 4 illustrates a schematic diagram of a system 400 that can be used in accordance with one set of embodiments. The system 400 can include one or more user computers 405. A user computer 405 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 405 can also have any of a variety of applications, including one or more applications configured to perform methods provided by various embodiments (as described above, for example), as well as one or more office applications, database client and/or server applications, and/or web browser applications. Alternatively, a user computer 405 can be any other electronic device, such as a thin-client computer, Internet-enabled mobile telephone, and/or personal digital assistant, capable of communicating via a network (e.g., the network 410 described below) and/or of displaying and navigating web pages or other types of electronic documents. Although the exemplary system 400 is shown with three user computers 405, any number of user computers can be supported.

Certain embodiments operate in a networked environment, which can include a network 410. The network 410 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 410 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™ IBM™ and the like, which can process requests from clients (including, depending on the configuration, dedicated database clients, API clients, web browsers, etc.) running on a user computer 405 and/or another server 415. In some embodiments, an application server can create web pages dynamically for displaying the information in accordance with various embodiments, such as pages for receiving user input to define a workflow, receiving user input as part of a workflow, and/or providing output to the user as part of the workflow and/or to indicate a result of the workflow. Data provided by an application server may be formatted as one or more web pages (comprising HTML, JavaScript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle database, that is adapted to store, update, and retrieve data in response to SQL-formatted commands. The database might be controlled and/or maintained by a database server, as described above, for example.

Figure 5:
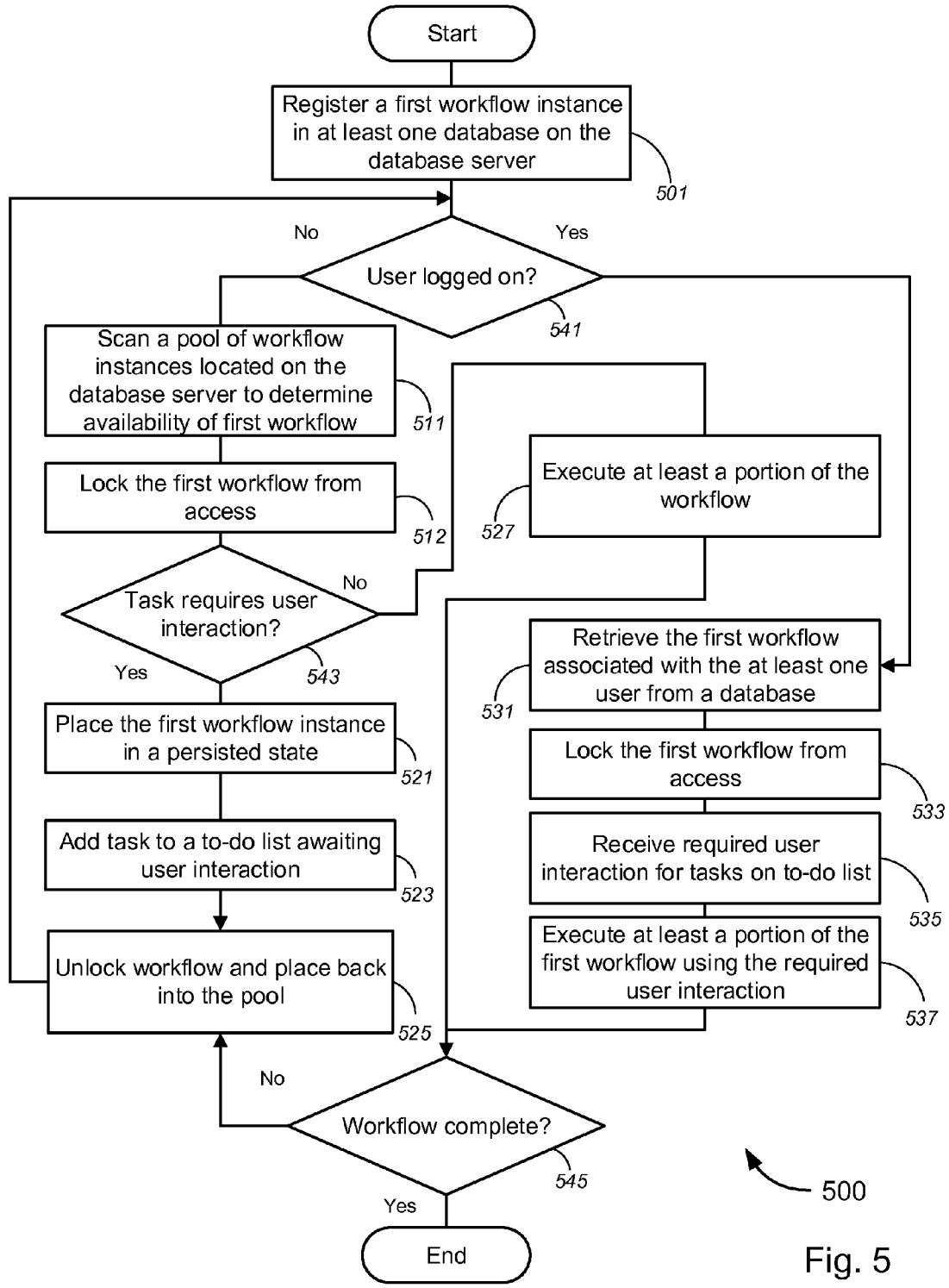
FIG. 5 is a process flow diagram illustrating a method of implementing an asynchronous, interactive workflow, in accordance with various embodiments.

FIG. 5 is a flow diagram depicting a method of executing a work flow 500. The flow chart begins, at block 501, by registering a first workflow instance in an at least one database on the database server. The work flow instance is configured by a user and associated with the user such that the user provides the necessary context (e.g., configuration file, etc.) under which the workflow is executed.

At decision block 541, the system determines whether a user is logged onto the system. If the user is not logged onto the system, the system attempts to automatically execute tasks for various workflows belonging to a pool of workflows saved on the database. At block 511, the pool of workflow instances is scanned to determine the availability of the first workflow. At block 512, the first workflow is locked, thus preventing access to the workflow by other workflow servers.

At decision block 543, a list of tasks associated with the first workflow is examined to determine whether the next task requiring completion requires user interaction. If the task does require user interaction, the first workflow is placed in persisted state, at block 521, and the task is added to a to-do list of tasks awaiting user interaction, at block 523. At block 525, the workflow is unlocked and placed back into the workflow pool (returning to decision block 541). If the task does not require user interaction, at least one task or step of the workflow is executed, at block 527. At decision block 545, the system determines whether the workflow has been completed. If the first workflow has been completed, the workflow execution process ends. If the first workflow has not been completed, the workflow is unlocked and placed back into the pool, at block 525.

At decision block 541, if the system determines that the user is logged on, the first workflow, which is associated with the user, is retrieved from the at least one database, at block 531. At block 533, access to the first workflow is locked. At block 535, the required user interaction is received from the user to complete the tasks on the to-do list. At block 537, at least one task or step of the first workflow is executed using the required user interaction. At decision block 545, the system determines whether the workflow has been completed. If the workflow has not been completed, the workflow is unlocked and placed back into the pool for the next step to be completed. If the workflow has been completed, the workflow process ends.

Within a workflow, the workflow service will begin execution of each task (workflow step) serially and will interact with the task to ascertain its status. When a task is completed, this is communicated to the service allowing the service to proceed with the next step. The task itself may require user input, or it may not, so part of the serialized instance of the particular running workflow step includes a flag "waiting for user interaction," which the step may return as its temporary step completion status. Real world automated tasks do not always find the resources needed to run or failures may occur during execution. Very complex code could attempt to recover these workflows, but this implementation takes the approach of allowing the human user to examine workflow status using the "Manage Smart Tasks" dialog and cancel or delete "orphaned" workflows and steps. In each case, the service does not need to be aware of these issues. It is effectively up to the computer (either client computer or server computer) to determine when a task is complete and to obtain the resources the task needs.

The Work Flow service, or "Smart Task" service, can launch a workflow based upon time or a database trigger event. Each Smart Task step can be autonomous and responsible for its resources. Each Smart Task step indicates its state, including when it has been completed. In some embodiments, each Smart Task step may call out to external service providers. In some aspects, the Smart Task service doesn't need to know the details of what each Smart Task step does, and the Smart Task service can coordinate the execution of subsequent steps based on the result of executing a particular step. The Smart Task service, in some cases, is responsible for maintaining the pool of executing workflows with their step status.

Various embodiments provide a user interface to allow interaction between a user and a computer system. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (an example of which is depicted by FIG. 1), each of which includes one or more user interface elements. As used herein, the term "user interface element" (also described as a "user interface mechanism" or a "user interface device"") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary.

Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to define workflows, interact with workflow instances, and/or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of performing an asynchronous, interactive workflow, the method comprising:
   generating, with a computer, a workflow comprising one or more tasks;
   receiving, with the computer, user context from an at least one user, wherein a first workflow instance is generated from the workflow and based in part on the user context, the first workflow instance associated with the at least one user;
   determining, with the computer, that the first workflow instance is in a state that a workflow service capable of accessing and executing the first workflow instance can execute at least a portion of the one or more tasks automatically, without user interaction, before executing the at least a portion of the one or more tasks;
   executing, with the computer, the at least a portion of the one or more tasks of the workflow automatically, without user interaction, in response to a trigger;
   detecting, with the computer, that a current task of the one or more tasks of the workflow requires user interaction;
   in response to detecting, with the computer, that the first workflow instance requires user interaction, placing the first workflow instance in a persisted state, wherein the persisted state indicates the status of the current task as awaiting user interaction;
   adding, with the computer, the current task to a to-do list of tasks requiring user interaction in response to determining that the current task requires user interaction;
   determining, with the computer, that one of the at least one user associated with the workflow has logged on;
   presenting, with the computer, at least one task from the to-do list to the one of an at least one user responsive to determining that one of the at least one user has logged on;
   receiving, with the computer, the required user interaction; and
   executing, with the computer, the at least one task from the to-do list based on the received user interaction.

2. The method of claim 1, further comprising:
   continuing to execute, with the computer, an additional task of the one or more tasks automatically after adding the current task to the to-do list.

3. The method of claim 1, further comprising:
   awaiting the required user interaction before proceeding to a subsequent task of the one or more tasks.

4. The method of claim 1, further comprising:
   registering the first workflow instance of the workflow in a database on a server, the first workflow instance associated with the at least one user;
   providing the workflow service on the server;
   identifying the first workflow instance from a pool of workflow instances in the database, the pool of workflow instances comprising the first workflow instance.

5. The method of claim 1, further comprising:
   retrieving the first workflow instance, upon determining that the first workflow instance has a persisted state that requires user interaction and responsive to the one of the at least one user logging on.

6. The method of claim 1, further comprising:
   locking the first workflow instance while it is being executed to remove the first workflow instance from the pool of workflow instances and prevent execution of the first workflow instance by any other workflow service; and
   unlocking the first workflow instance and placing the first workflow instance back into the pool of workflow instances in response to executing the at least a portion of the one or more tasks or placing the first workflow instance in a persisted state.

7. The method of claim 1, further comprising queuing a plurality of workflow instances, each of which is in a state requiring user interaction.

8. The method of claim 7, further comprising:
   presenting each of the queued workflow instances to a user to receive the required user interaction; and
   continuing execution of each of the queued workflow instances after receiving the required user interaction in each workflow instance.

9. A program product comprising a non-transitory computer readable medium having encoded thereon a set of instructions, executable by one or more microprocessors to perform one or more operations, the set of instructions comprising:
- instructions for generating a workflow comprising one or more tasks;
- instructions for receiving, user context from an at least one user, wherein a first workflow instance is generated from the workflow and based in part on the user context, the first workflow instance associated with the at least one user;
- instructions for determining, that the first workflow instance is in a state that a workflow service capable of accessing and executing the first workflow instance can execute at least a portion of the one or more tasks automatically, without user interaction, before executing the at least a portion of the one or more tasks;
- instructions for executing the at least a portion of the one or more tasks of the workflow automatically, without user interaction, in response to a trigger;
- instructions for detecting that a current task of the one or more tasks of the workflow requires user interaction;
- instructions for placing the first workflow instance in a persisted state, in response to detecting that the first workflow instance requires user interaction, wherein the persisted state indicates the status of the current task as awaiting user interaction;
- instructions for adding the current task to a to-do list of tasks requiring user interaction in response to determining that the current task requires user interaction;
- instructions for determining that one of the at least one user associated with the workflow has logged on;
- instructions for presenting at least one task from the to-do list to the one of an at least one user responsive to determining that one of the at least one user has logged on;
- instructions for receiving the required user interaction; and
- instructions for executing the at least one task from the to-do list based on the received user interaction.

10. The program product of claim 9, further comprising instructions for continuing to execute an additional task of the one or more tasks automatically after adding the current task to the to-do list.

11. The program product of claim 9, further comprising instructions for awaiting the required user interaction before proceeding to a subsequent task of the one or more tasks.

12. The program product of claim 9, further comprising:
- instructions for registering the first workflow instance of the workflow in a database on a server, the first workflow instance associated with the at least one user;
- instructions for providing the workflow service on the server;
- instructions for identifying the first workflow instance from a pool of workflow instances in the database, the pool of workflow instances comprising the first workflow instance.

13. The program product of claim 9, further comprising instructions for retrieving the first workflow instance, upon determining that the first workflow instance has a persisted state that requires user interaction and responsive to the one of the at least one user logging on.

14. The program product of claim 9, further comprising:
- instructions for locking the first workflow instance while it is being executed to remove the first workflow instance from the pool of workflow instances and prevent execution of the first workflow instance by any other workflow service; and
- instructions for unlocking the first workflow instance and placing the first workflow instance back into the pool of workflow instances in response to executing the at least a portion of the one or more tasks or placing the first workflow instance in a persisted state.

15. A system for executing an unattended, interactive workflow, the system comprising:
- a client computer; and
- a server in communication with the client computer via a network connection;
- at least one of the client computer or the server is configured to:
  - generate a workflow comprising one or more tasks;
- the client computer further is configured to:
  - receive user context from the at least one user, wherein a first workflow instance is generated from the workflow and based in part on the user context, the first workflow instance associated with the at least one user;
  - indicate to the server that one of an at least one user associated with the workflow has logged on; and
  - present at least one task from a to-do list to the one of an at least one user responsive to determining that one of the at least one user has logged on, wherein the to-do list comprises a list of tasks requiring user interaction; and
- the server is further configured to:
  - receive user context from the client computer, wherein the first workflow instance is generated from the workflow and based in part on the user context, the first workflow instance associated with the at least one user;
  - determine that the first workflow instance is in a state that a workflow service capable of accessing and executing the first workflow instance can execute at least a portion of the one or more tasks automatically, without user interaction, before executing the at least a portion of the one or more tasks;
  - execute the at least a portion of the one or more tasks of the workflow automatically, without user interaction, in response to a trigger;
  - detect that a current task of the one or more tasks of the workflow requires user interaction;
  - place the first workflow instance in a persisted state, in response to detecting that the first workflow instance requires user interaction, wherein the persisted state indicates the status of the current task as awaiting user interaction;
  - add the current task to the to-do list of tasks requiring user interaction in response to determining that the current task requires user interaction;
  - determine that the one of the at least one user associated with the workflow has logged on, based on an indication sent by the client computer;
  - cause at least one task from the to-do list to be presented to the one of an at least one user responsive to determining that one of the at least one user has logged on;
  - receive the required user interaction; and
  - execute the at least one task from the to-do list based on the received user interaction.

16. The system of claim 15, wherein the client computer or server are further configured to continue to execute an additional task of the one or more tasks automatically after adding the current task to the to-do list.

17. The system of claim 15, wherein the server is further configured to await receiving the required user interaction before proceeding to a subsequent task of the one or more tasks.

18. The system of claim 15, wherein:
the server is further configured to:
register the first workflow instance of the workflow in a database accessible by the server, the first workflow instance associated with the at least one user;
provide the workflow service;
identify the first workflow instance from a pool of workflow instances in the database, the pool of workflow instances comprising the first workflow instance.

19. The system of claim 15, wherein the server is further configured to retrieve the first workflow instance, upon determining that the first workflow instance has a persisted state that requires user interaction and responsive to the one of the at least one user logging on.

20. The system of claim 15, wherein the server or client are further configured to:
lock the first workflow instance while it is being executed to remove the first workflow instance from the pool of workflow instances and prevent execution of the first workflow instance by any other workflow service; and
unlock the first workflow instance and place the first workflow instance back into the pool of workflow instances in response to executing the at least a portion of the one or more tasks or place the first workflow instance in a persisted state.

\* \* \* \* \*